Feb. 24, 1959
J. T. DUANE
2,874,441
CLAMPING BAND
Filed Nov. 26, 1956
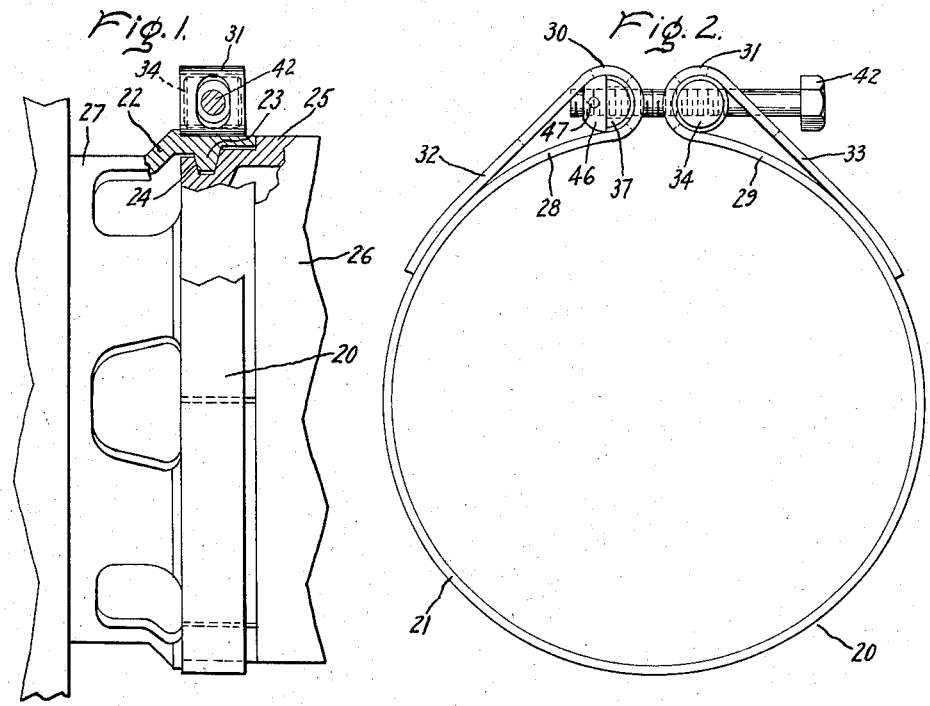
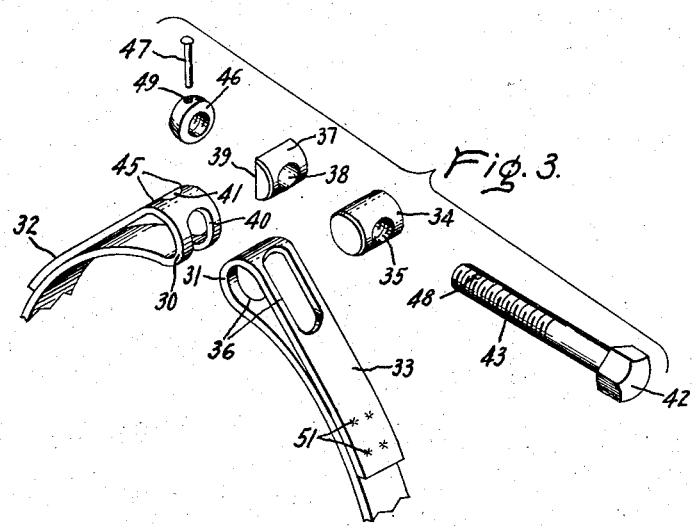
Inventor:
James T. Duane,
by Vernon F. Kalb
His Attorney.

United States Patent Office 2,874,441
Patented Feb. 24, 1959

2,874,441

CLAMPING BAND

James T. Duane, Erie, Pa., assignor to General Electric Company, a corporation of New York Application November 26, 1956, Serial No. 624,293

2 Claims. (Cl. 24—279)

This invention relates to clamping bands for securing detachable parts together and more particularly to such clamping bands of high strength which are simply and inexpensively made and is an improvement on the invention of application Serial No. 444,234 of Irving H. Kalikow and Albert H. Labastie entitled "High Pressure Clamping Band" which is assigned to the assignee of this application.

Clamps of the type here concerned ordinarily are made from steel forgings which are machined and ground and hence are very costly to manufacture. Previous band type clamps formed from a strap of thin metal have not been strong enough to withstand the tensile loads required of such bands when used as high pressure applying devices such as in mounting flanges of the type which are used for aircraft accessories and which are disclosed and claimed in U. S. Patent 2,645,438 to Irving Kalikow, which is assigned to the assignee of the present invention. As more particularly pointed out in the referenced patent, the vibrational forces encountered in use are high and consequently require a construction which is of high strength and which is non-resilient so that the vibrations are ineffective in producing a momentary loosening of the mounting flange at their maximum amplitudes. One of the important objects of this invention is to provide an improved clamping band for such a construction.

Another object of this invention resides in the provision of a clamping band suitable for withstanding high tensile forces having provisions to limit the maximum stress imposed thereon.

Further objects and advantages of this invention will become apparent and this invention will be better understood from the following description referring to the accompanying drawing, and the features of novelty which characterize this invention will be pointed out with particularity in the claims annexed to and forming part of this specification.

In the drawing, there is shown in Fig. 1 the fragmentary side view, partly in section, of a mounting flange construction incorporating the improved clamping band of this invention.

Fig. 2 is a side elevational view of the improved clamping band of this invention in assembled form.

Fig. 3 is an exploded fragmentary perspective view of the improved clamping band of this invention illustrating the fastening means thereof.

Briefly stated, this invention provides a clamping band having tear-shaped loops at each end thereof formed by folding back the free ends of the band and providing for the reception of the fastening screw and connectors. The connectors are shaped to exactly mate with the ends of the loops to minimize resiliency due to flexure of the loops in tightening. One of the connectors has a threaded aperture for the reception of a tightening screw. The other of the connectors is provided with a large bearing surface which cooperates with a force distributing journal non-rotatably secured to the end of the tightening screw to provide an enlarged shoulder for the screw so that a very high load may be transmitted between these parts. The means utilized to non-rotatably secure the journal to the screw is designed to shear if a tightening torque greater than a predetermining amount is applied to the tightening screw.

Referring now to the drawing in which like numerals indicate like parts, the reference character 20 designates generally the clamp embodying the present invention. Clamp 20 comprises a flexible metallic strip formed of any suitable metal such, for example, as ⅛" thick stainless steel and which constitutes the circular clamp band 21. The band 21 is shown as being seated around a segmented mounting flange member 22 having radially inwardly projecting wedge portions 23 which engage corresponding grooves 24 of a mating non-segmented flange member 25 of an accessory 26 which is adapted to be connected to a mounting flange 27.

The band 21 is discontinuous at one point about its circumference to provide end portions 28 and 29. End portions 28 and 29 are respectively provided with back strap portions 32 and 33 which are folded back to form loops 30 and 31 respectively, and are secured to the band 21 by any suitable means such as spot welds 51. In order to obtain the minimum resiliency in the loops 30 and 31 when under tension, the back strap portions 32 and 33 are connected to band 21 at a point tangent to the periphery thereof.

A cylindrical nut 34 having a transverse threaded aperture 35 is provided for disposition in loop 31 with the aperture 35 aligned with the slots 36 in the sides of loop 31. In the preferred form, nut 34 is solid and dimensioned to nest closely in loop 31 to result in only tension forces being applied, during the tightening of clamp 20, to the straps forming loop 31 which are tangential to its outer surface.

To provide a stress distributing member in loop 30 which functions in a manner similar to nut 34, a semi-cylindrical spacer member 37 having a transverse non-threaded aperture 38 is provided. Spacer member 37 is shaped and dimensioned to closely conform to the end of loop 30 to insure that only tensile forces will be applied to the straps forming the loop 30. On its side remote from the end of loop 30 spacer member 37 provides a flat bearing surface 39 to which the tightening forces are transmitted from the tightening screw as hereinafter more fully explained. Slots 40 and 41 are provided in the strap portions forming loop 30, and in use aperture 38 is aligned with these slots.

A tightening screw 42 is spanned between nut 34 and spacer 37 with the threaded end 43 of the screw being received in the threaded aperture 35 of the nut. If desired the threaded end 43 of screw 42 may be provided with left-hand threads so that tightening the clamp ring 20 may be accomplished by turning screw 42 in the usual direction. Spacer 37 is slidable on the threaded portion 43 of screw 42.

In order to transmit forces between tightening screw 42 and the bearing surface 39 of spacer 37, it is essential that a load distributing means such as a shoulder on the tightening screw 42 be provided. Due to the very high pressures which must be transmitted between screw 42 and spacer member 37 to obtain the desired clamping force, such a shoulder must be larger than the diameter of the threaded portion 43. To provide such a load distributing means, there is provided an apertured journal member 46 which is shown as being threaded on tightening screw 42 after being inserted laterally into loop 30. Journal member 46 effectively provides an enlarged shoulder for screw 42 having a diameter substantially greater than the width of slots 40 or 41 to distribute the tightening force over a large area of the bearing surface 39 of spacer 37. A locking pin 47 is inserted through communicating openings 48 and 49 transverse the axis of screw 42 and journal 46, respectively. The pin 47 non-rotatably secures the journal member 46 to the screw 42 causing the journal member normally to turn with the screw 42. During the tightening operation, the frictional load or force appearing between the flat surface 39 of spacer 37 and the enlarged flat surface of journal member 46 is shared by two cooperating elements—the engaging threads between the journal element 46 and screw 42, and the transverse pin 47. It is an important feature of this invention that by providing a pin 47 with a predetermined shear strength, automatic protection is obtained against tightening the clamp ring 20 beyond a pre-set limit. However, any attempt to overtighten will result in (1) a shearing of pin 47 but there will be no loss of tension in the clamp band, and (2) an attempt to continue tightening after failure of the pin will have no effect on the tensile load carried by the screw (since it backs out of both the journal 46 and the nut 34 at the same time). Tensile load in the screw will not be released until the screw has been backed all the way out of the journal. Further, the pin 47 is located so that it is stressed only during the tightening operation and hole 48 is located in the screw 42 at a point where the screw is required to carry a relatively small part of the tensile load imposed on other portions of screw 42.

The operation of the means for tightening the clamp 20 is simple and effective. By tightening the screw 42, loops 30 and 31 are drawn toward each other. Because only tension forces are applied to the strap portions forming the loop due to the construction and arrangement of nut 34 and spacer member 37, the flexure normally encountered in thin metal bands is minimized. Moreover, because journal member 46 serves to provide tightening screw 42 with an enlarged stress distributing shoulder a reduced diameter for the threaded portion of screw 42 is not required and the width of the back strap portions 45 defining opening 41 is a maximum.

While there is shown and described one particular embodiment of this invention, it is to be understood that modifications thereof will occur to those skilled in the art. It is to be understood, therefore, that it is intended by the appended claims to cover all modifications which are within the spirit and scope of this invention.

What I claim as new and desire to secure by Letters Patent of the United States is:

1. A clamp assembly comprising a circular band of flexible metal having a pair of free end portions, said free end portions being folded back on said band to form a loop, a solid cylindrical nut loosely disposed in one of said loops and dimensioned for tangential engagement of the sides thereof, a solid transversely apertured semi-cylindrical spacer loosely disposed in the second of said loops, said spacer being shaped to maintain the shape of the said end of the loop under tension and providing a flat bearing surface remote from the end of said second loop, a tightening screw threadedly engaging the nut and extending through a slot in said second loop and through said spacer, the diameter of said screw being substantially equal to the width of said slot, a journal member threaded on the end of said screw in the second loop and providing an enlarged bearing shoulder on said screw engaging the cooperating flat bearing surface of said spacer for the transmission of force therebetween, torque-limiting means for securing said journal member to said screw, and means disposed at the end of said screw opposite from said journal member for effecting rotation of said screw.

2. A clamp assembly comprising a circular band of flexible metal having a pair of free end portions, the end portions of said band being folded back to form tear-shaped loops on each end thereof, said loops being tangentially secured to said band; a solid cylindrical nut having a threaded aperture loosely disposed in one of said loops and dimensioned for tangential engagement of the sides thereof; a solid transversely apertured semi-cylindrical spacer loosely disposed in the second of said loops providing a flat bearing surface; a tightening screw threadedly engaging the nut and extending through a slot in said second loop and through said spacer, the diameter of said screw being substantially equal to the width of said slot, a journal member positioned in the second loop threadedly engaging said screw and providing a flat enlarged bearing shoulder for said screw for engaging the cooperating flat bearing surface of said spacer for transmitting forces therebetween over a large area, a pin having a preselected shear value non-rotatably securing said journal member to said screw, and means disposed at the end of said screw adjacent to said nut for effecting rotation of said screw.

References Cited in the file of this patent

UNITED STATES PATENTS

| | | |
|---|---|---|
| 1,621,490 | Bovey | Mar. 22, 1927 |
| 2,341,828 | Tetzlaff | Feb. 15, 1944 |
| 2,607,258 | King et al. | Aug. 19, 1952 |
| 2,661,463 | Johnson | Dec. 1, 1953 |

FOREIGN PATENTS

| | | |
|---|---|---|
| 576,543 | Great Britain | Apr. 9, 1946 |